United States Patent
Poniatowski

(10) Patent No.: US 9,645,997 B2
(45) Date of Patent: *May 9, 2017

(54) PHRASE-BASED COMMUNICATION SYSTEM

(71) Applicant: TiVo Solutions Inc., San Carlos, CA (US)

(72) Inventor: Robert F. Poniatowski, San Jose, CA (US)

(73) Assignee: TiVo Solutions Inc., San Carlos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/885,844

(22) Filed: Oct. 16, 2015

(65) Prior Publication Data

US 2016/0034444 A1 Feb. 4, 2016

Related U.S. Application Data

(63) Continuation of application No. 13/077,712, filed on Mar. 31, 2011, now Pat. No. 9,215,506.

(51) Int. Cl.
  *G06F 3/0484* (2013.01)
  *G06F 17/24* (2006.01)
  (Continued)

(52) U.S. Cl.
  CPC .......... *G06F 17/276* (2013.01); *G06F 3/0482* (2013.01); *G06F 3/04842* (2013.01);
  (Continued)

(58) Field of Classification Search
  CPC ........ G06F 3/048; G06F 15/16; G06F 17/276; G06Q 50/01; H04N 21/4788; H04N 21/8133; H04N 21/42204; H04N 21/252
  See application file for complete search history.

(56) References Cited

U.S. PATENT DOCUMENTS 6,591,292 B1  7/2003  Morrison et al.
6,983,305 B2  1/2006  Danker et al.
(Continued)

FOREIGN PATENT DOCUMENTS

CN  101500125        8/2009
EP   1 147 660 A1   10/2001
(Continued)

OTHER PUBLICATIONS

United States Patent and Trademark Office, U.S. Appl. No. 13/077,712, Non-Final Office Action dated Jan. 31, 2014.
(Continued)

*Primary Examiner* — Dustin Nguyen
*Assistant Examiner* — Juan C Turriate Gastulo
(74) *Attorney, Agent, or Firm* — Ropes & Gray LLP

(57) ABSTRACT

A client device, such as a digital video recorder, provides a phrase-based communication system in which users are presented with a dynamic messaging interface of selectable phrases and other elements. At least some of the phrases may be selected using algorithms that identify phrases that are likely to be useful to the particular user and/or the context in which the user is creating a message. In this manner, a user is able to generate useful messages quickly, without being limited to stale and fixed canned messages. Popular phrases may be identified by, for example, a server that relays based on messages exchanged between users. These popular phrases may then be harvested for use in the dynamic messaging interface. Moreover, context-sensitive metadata elements may be added to the dynamic messaging interface based on, for example, content that the user is currently viewing or about which the user is currently accessing information.

21 Claims, 7 Drawing Sheets

(51) Int. Cl.
*H04L 12/58* (2006.01)
*G06F 3/0482* (2013.01)
*G06F 17/27* (2006.01)
*G06Q 50/00* (2012.01)
*H04N 21/4788* (2011.01)
*H04N 21/25* (2011.01)
*H04N 21/422* (2011.01)
*H04N 21/81* (2011.01)

(52) U.S. Cl.
CPC ............ *G06F 17/24* (2013.01); *G06Q 50/01* (2013.01); *H04L 51/043* (2013.01); *H04N 21/252* (2013.01); *H04N 21/42204* (2013.01); *H04N 21/4788* (2013.01); *H04N 21/8133* (2013.01)

(56) References Cited

U.S. PATENT DOCUMENTS

| | | | |
|---|---|---|---|
| 9,215,506 | B2 | 12/2015 | Poniatowski |
| 2002/0184309 | A1 | 12/2002 | Danker et al. |
| 2003/0097301 | A1 | 5/2003 | Kageyama et al. |
| 2006/0025091 | A1 | 2/2006 | Buford |
| 2007/0067157 | A1* | 3/2007 | Kaku ............... G06F 17/2775 704/10 |
| 2009/0174667 | A1* | 7/2009 | Kocienda ............ G06F 3/0237 345/169 |
| 2009/0304346 | A1 | 12/2009 | Prestenback et al. |
| 2010/0287465 | A1 | 11/2010 | Vuong |
| 2011/0035211 | A1* | 2/2011 | Eden ............... G06F 17/2735 704/10 |
| 2012/0159543 | A1* | 6/2012 | Jin ............... H04N 21/25841 725/39 |
| 2012/0254318 | A1 | 10/2012 | Poniatowski |
| 2013/0046544 | A1 | 2/2013 | Kay et al. |

FOREIGN PATENT DOCUMENTS

| | | |
|---|---|---|
| EP | 1 197 086 A1 | 4/2002 |
| JP | 2004-153398 | 5/2004 |
| JP | 2007-079745 | 3/2007 |
| JP | 2007-178212 | 7/2007 |
| JP | 2007-529055 | 10/2007 |
| JP | 2010-187387 | 8/2010 |

OTHER PUBLICATIONS

United States Patent and Trademark Office, U.S. Appl. No. 13/077,712, Final Office Action dated Jun. 10, 2014.
United States Patent and Trademark Office, U.S. Appl. No. 13/077,712, Notice of Allowance dated Apr. 1, 2015.
United States Patent and Trademark Office, U.S. Appl. No. 13/077,712, Notice of Allowance dated Jul. 17, 2015.
Chinese Patent Office, Application No. 201180070782.0, Foreign Office Action dated Jul. 14, 2015.
Chinese Patent Office, Application No. 201180070782.0, Pending Claims as of Jul. 14, 2015.
European Patent Office, Application No. 11862236.4, Pending Claims as of Aug. 11, 2014.
European Patent Office, Application No. 11862236.4, Search Report dated Aug. 11, 2014.
Japanese Patent Office, Application No. 2014-502531, Foreign Office Action dated Nov. 18, 2014.
Japanese Patent Office, Application No. 2014-502531, Foreign Office Action dated Aug. 4, 2015.
Japanese Patent Office, Application No. 2014-502531, Pending Claims as of Nov. 18, 2014.
Japanese Patent Office, Application No. 2014-502531, Pending Claims as of Aug. 4, 2015.
Chinese Patent Office, Application No. 201180070782.0, Foreign Office Action dated Mar. 7, 2016.
Chinese Patent Office, Application No. 201180070782.0, Pending Claims as of Mar. 7, 2016.
European Patent Office, Application No. 11862236.4, Foreign Office Action dated Apr. 1, 2016.
European Patent Office, Application No. 11862236.4, Pending Claims as of Apr. 1, 2016.
Chinese Patent Office, Application No. 201180070782.0, Foreign Office Action dated Sep. 26, 2016.
Chinese Patent Office, Application No. 201180070782.0, Pending Claims as of Sep. 26, 2016.

\* cited by examiner

PHRASE-BASED COMMUNICATION SYSTEM

PRIORITY CLAIM

This application claims benefit under 35 U.S.C. §120 as a Continuation of application Ser. No. 13/077,712, filed Mar. 31, 2011, the entire contents of which is hereby incorporated by reference as if fully set forth herein. Applicant hereby rescinds any disclaimer of claim scope in the parent application or the prosecution history thereof and advise the USPTO that the claims in this application may be broader than any claim in the parent application.

FIELD OF THE INVENTION

Embodiments of the invention described herein relate generally to communications systems, and, more specifically, to techniques for phrase-based user interfaces.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The proliferation of communications tools and resources, such as instant messaging clients, text messages, email, and social networking sites, has created a demand to exchange messages about any imaginable subject at any possible time from any possible device. Unfortunately, this demand is stifled by the limitations of the available input mechanisms and interfaces. For example, while many users are very adept at generating messages via input at computer keyboards, mobile phone number pads, and touch screens, these input mechanisms may be unavailable or even undesirable for devices such as entertainment consoles, media centers, and gaming consoles.

One technique for providing messaging interfaces in devices that lack a keyboard is to present an on-screen interface in which each key of the keyboard is depicted as an on-screen control. The controls of the on-screen interface may be selectable, for instance, via a user input at a remote control or gaming pad, such as a combination of arrow button inputs and an "enter" button input. Another technique for providing messaging interfaces relies upon the utilization of number buttons on a remote control in a "T9 mode," similar to the manner in which one uses a number pad on a mobile phone to generate text messages. Both techniques may be further enhanced by presenting the user with a short menu of "predictive text" as the user inputs words, so that the user need only input a few characters of most word.

Yet another technique involves presenting to the user, along with an on-screen keyboard interface, a menu comprising a limited number of "canned messages." The text of these messages may be pre-defined by the manufacturer, or customized by the user. Thus, if the user expects to send a message such as "be right back" very often, the user may define a corresponding "be right back" canned message. The interface may then feature a canned message menu from which "be right back" and other defined phrases can be selected and inserted into any message.

Unfortunately, users often find the above described techniques to be cumbersome or limiting. In fact, in situations where users may only be willing to devote a limited amount of attention to generating a message, such as while gaming or watching video content, users may even find keyboards to be unduly cumbersome. Accordingly, users often do not take advantage of messaging services that are or could be provided.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
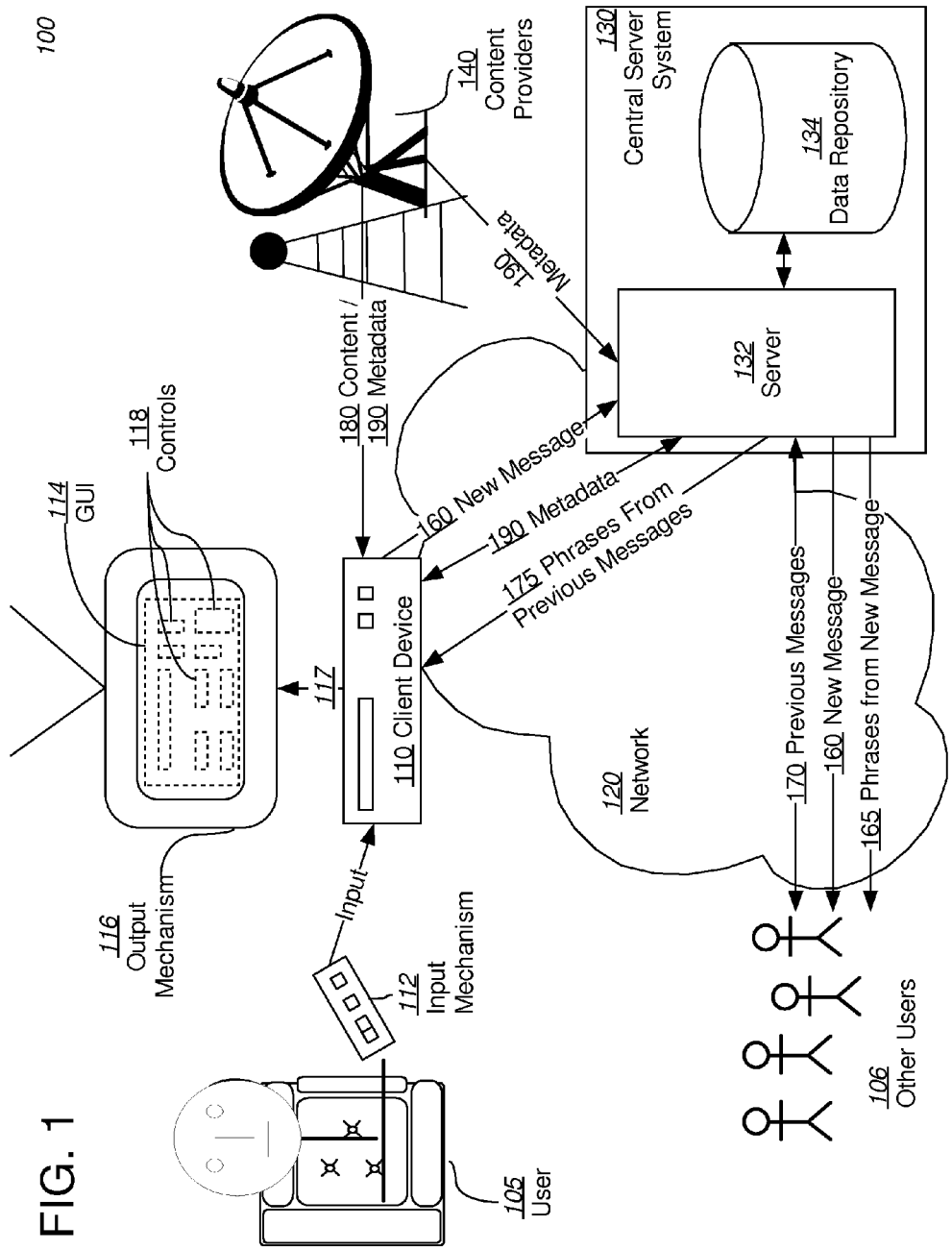
FIG. 1 is a block diagram of a system 100 in which the techniques described herein may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Structural Overview
3.0. Functional Overview
4.0. Example Interfaces
    4.1. Example Interface with Word-Based and Icon-Based Elements
    4.2. Scrolling Interface Controls/Switching Input Modes
    4.3. Example Technique for Selection of Controls
    4.4. Example Message Display Field
    4.5. Example Interface with Phrase-Based Elements
    4.6. Example Interface with Metadata-Based Elements
    4.7. Example Interface with Integrated Programming Guide
5.0. Example Implementation Details
    5.1. Context Awareness
    5.2. Harvesting Phrase Data from Messages
    5.3. Selecting Phrases for Inclusion as Phrase-Based elements
    5.4. Context-Sensitive Metadata
    5.5. Dynamic Interface Layout based on Predicted Next Elements
    5.6. User of Selection of an Activity from Within the Message Generation Interface
    5.7. Implementation in Non-Centralized Environments
6.0. Implementation Mechanism-Hardware Overview
7.0. Extensions and Alternatives

1.0. GENERAL OVERVIEW

Approaches, techniques, and mechanisms are disclosed for a phrase-based communication system in which users are presented with a dynamic messaging interface of selectable phrases. According to an embodiment, the phrases are selected using algorithms that identify phrases that are likely to be useful to the particular user and/or the context in which the user is creating a message. In this manner, a user is able to generate useful messages quickly, without being limited to stale and fixed canned messages.

In an embodiment, phrases for a messaging interface are learned from messages previously sent by other users. For example, a central server system may be responsible for relaying messages generated in accordance with the described technique. The central server system may analyze messages as they are sent to detect commonly used phrases. The central server system may then feed these commonly used phrases to the messaging interface. The messaging interface may then present the commonly used phrases in a list of selectable phrases, so as to allow the user of the interface to insert any of the commonly used phrases in a message simply by selecting the desired phrases. Commonly used phrases may be selected for all users of the central server system, or relative to individual communities of users. Commonly used phrases may further be selected relative to contexts, such as the time of year or an activity in which the user of the messaging interface is participating.

In an embodiment, phrases for a messaging interface are selected from metadata associated with the user's current context, as indicated by an activity in which the user is engaged while the user is generating the message. For example, the activity may be watching or accessing information about viewable and/or audible content, and the metadata may be information about that content. The messaging interface may, for instance, be launched while the user is watching a particular video via the device. Or, while utilizing the messaging interface to generate a message, the user may navigate a media guide and select a listing of information for a particular program therein. In both examples, the messaging interface may be populated with metadata for the particular video or program. The metadata may include, for example, a title, episode name, actor or actress name, broadcast date, and so on. The metadata itself may have been collected from a variety of sources, including without limitation a content provider, service provider, event organizer, distributor, reviewer, and/or other users. In an embodiment, metadata may be filtered or sorted based at least partially upon which metadata is most commonly used in messages sent by the user and/or a group of other users.

In an embodiment, the system may also or instead select elements for inclusion in a messaging interface for purposes such as advertising or market testing. In an embodiment, the messaging interface allows a user to select and insert elements other than phrases, including images, music, video, links, animations, calendar items, and so on. Some or all of these elements may be selected using the techniques described above. Thus, when this description discusses steps and processes with respect to "phrases," it should be understood that the steps and processes are also applicable to a variety of other elements, with little or no modification.

In an embodiment, the messaging interface is implemented by a digital video recorder connected to a central server. While watching a video or television program, or while navigating a program guide listing information about a video or television program, the user may request that the digital video recorder provide the messaging interface. For example, the user may click on a button on a remote control that allows the user to create an email, text message, instant message, or social networking service status message. In response to this request, the digital video recorder communicates with a central server to obtain one or more lists of commonly-used phrases and metadata, based on the video or television program. The digital video recorder displays the messaging interface on a display connected to the digital video recorder. The digital video recorder builds the interface using controls such as ASCII characters, icons, canned messages, and a friends list. The digital video recorder further includes in the interface controls corresponding to the metadata and commonly-used phrases selected by the central server. The user navigates the interface to select elements to insert into the message, as well as to select one or more intended recipients. When the user has finished building the message, the digital video recorder sends the message to the central server for distribution. The central server delivers the message to its one or more intended destinations. The central server also analyses the message for the purpose of harvesting phrase data and metadata for future messaging interfaces.

In other aspects, the invention encompasses a computer apparatus and a computer-readable medium configured to carry out the foregoing steps.

2.0. STRUCTURAL OVERVIEW

FIG. 1 is a block diagram of a system 100 in which the techniques described herein may be practiced.

System 100 comprises a client device 110 connected via a network 120 to a central server system 130. User 105 operates client device 110 via an input mechanism 112 to, among other purposes, generate and send messages to recipients 160. Input mechanism 112 is, for example, a remote control, gaming pad, touch pad, touch screen, keyboard, pointing device, mobile phone, or any other suitable input device capable of sending input to client device 110.

To facilitate the composing of messages, client device 110 implements a graphical user interface ("GUI") 114 for user 105. Client device 110 displays GUI 114 on an output mechanism 116. Output mechanism 116 is, for example, a television, monitor, touchpad, tablet computing device, remote control with touchscreen display, Bluetooth-enabled personal digital assistant, wireless-enabled smartphone, smartphone, or any other device capable of responding to instructions from a client device 110 by displaying GUI 114 to user 105. Output mechanism 116 receives instructions from GUI 114 via communication link 117, which may be wired or wireless, and which may furthermore be a direct link or involve one or more networked switches or routers. In an embodiment, output mechanism 116 and client device 110 may be contained in a common device, e.g., a tablet computing device, smartphone, etc.

Central server system 130 may comprise one or more server devices 132 responsible for communicating with client device 110 over network 120. Central server system 130 may be any system capable of relaying messages from one party to another. Network 120 may be implemented via any suitable combination of communication links, including the Internet, telephone lines, and/or wireless connections. In an embodiment, central server system 130 may also be operated by a provider of metadata 190—for example, a provider of an electronic programming guide, such as TiVo Inc. However, in other embodiments, central server system 130 does not provide metadata 190, as client device 110 may obtain such information from sources other than central server system 130.

In an embodiment, user 105 utilizes client device 110 while participating in an activity. Example activities include, but are not limited to, viewing, listening to, or accessing information about content such as television episodes, movies, songs, online videos, websites, concerts, and so on. Example activities further include, without limitation, playing video games and participating or accessing information about other real-time events. Watching a live television broadcast, listening to a downloaded song, blogging, vlogging, and attending a social event are all activities in which a user may participate, within the meaning of this description.

In an embodiment, user 105 utilizes client device 110 to participate in this activity. For example, client device 110 may be a television, media center, set-top box, gaming device, handheld device, tablet computing device, digital video recorder, etc., used to consume multimedia content. User 105 may trigger GUI 114 at any time while consuming multimedia content. Or, as another example, user 105 may trigger GUI 114 while using client device 110 while browsing multimedia information in a programming guide. Client device 110 may present such multimedia content or information at output device 116 or at one or more other output devices. In an embodiment, the multimedia content or information persists either visibly or invisibly in the background while client device 110 presents GUI 114, so that once user 105 finishes with GUI 114, user 105 is returned to the multimedia content or information.

To facilitate participation in an activity, client device 110 may interact with one or more content providers 140 and/or central server system 130. For example, content providers 140 may include broadcast television stations, cable providers, satellite video or music providers, Internet content providers, and so on. Content providers 140 may transmit a variety of content 180 and metadata 190 about content 180 to client device 110 through any of a variety of transmission means. As another example, central server system 130 may provide client device with metadata 190 about content 180 via, for instance, an Electronic Programming Guide. In an embodiment, central server system 130 and content providers 140 are the same entity.

Via GUI 114, client device 110 presents to user 105 one or more sets of selectable interface controls 118. Each of interface controls 118 represents one or more elements that may be inserted into a message 160 to be generated by client device 110. Elements may include, without limitation, characters, phrases, images, or multimedia objects. By selecting a particular control, user 105 may insert the element represented by the particular control into message 160. Some of controls 118 may be used to implement an on-screen keyboard interface, as described previously. That is to say, some of controls 118 represent ASCII characters that would be found on a typical computer keyboard. User 105 may swap individual controls 118 and sets of controls 118 in and out of GUI 114 by selecting certain buttons at input mechanism 112 (e.g. a scroll button) or selecting certain designated controls in GUI 114. Thus, at any given time, only a portion of the controls 118 available via GUI 114 may be displayed to user 105.

The elements represented by at least some of controls 118 are selected dynamically by central server system 130. For example, central server system 130 may employ a variety of algorithms, based on a variety of data, to identify elements that are most likely to be useful to the user in generating message 160. In this manner, system 100 allows user 105 to generate useful messages quickly, without being limited to stale and fixed canned messages. Central server system 130 may also or instead select elements for purposes such as advertising or market testing.

Central server system 130 includes one or more data repositories 134. Data repositories 134 may be any source of data, including files, databases, and so on. In an embodiment, a data repository 134 includes data indicating phrases harvested from messages 170 sent by users in a group of users 106 also connected to central server system 130. Data repository 134 may further include data indicating usage trends for these phrases. Based at least on this data, central server system 130 identifies certain phrase-based elements 175 for which GUI 114 should present controls 118. User 105 may then use controls 118 to insert some or all of phrase-based elements 175 into message 160.

In an embodiment, data repository 134 includes metadata 190 that can be associated with activities. Example metadata is described in section 5.4. Central server system 130 utilizes this metadata to identify context-sensitive metadata elements to add to GUI 114. To this end, central server system 130 receives context data from client device 110 or any other suitable source. The context data indicates at least some aspect of an activity or activities in which user 105 is currently participating. Central server system 130 may then retrieve metadata 190 associated with the appropriate context. For example, where the activity involves watching an event or content, client device 110 may share an event or content identifier with the central server system. Based on the event or content identifier, the central server system 130 may retrieve metadata for the event or content. Central server system 130 then identifies some or all of the retrieved metadata as metadata-based elements 190 for which GUI 114 should present controls 118. User 105 may then use controls 118 to insert certain of metadata-based elements 190 into message 160.

Once generated, message 160 may be relayed to one or more other users 106, as designated by user 105, via a variety of means. For example, as depicted, client device 110 forwards message 160 to central server system 130, which then forwards message 160 to the designated one or more other users 106. In an embodiment, central server system 130 may further mine message 160 for additional information to include in data repository 134, including updated popularity data or contextual data for phrases selected by user 105, as well as new phrases 165 to be utilized as elements in subsequent message generation interfaces by user 105 and/or other users 106.

FIG. 1 is merely an example of a system in which the techniques described herein may be practiced. Other systems in which the techniques described herein may be practiced may include more or fewer components in different arrangements. Example alternative arrangements are discussed throughout this description. Also, the division of work between components may vary from embodiment to embodiment. For example, some or all of the functions described as being performed by central server system 130 and content providers 140 may instead be performed by client device 110 based on a local version of data repository 134. For simplicity, many examples given throughout this description will be described in terms of a messaging interface, such as GUI 114, that is provided by a client device 100 functioning, at least in part, as an entertainment device through which a user accesses information provided by a central server system 130 about video content from content providers 140. However, any techniques described in such terms are equally applicable to any messaging interface provided by any client device.

3.0. FUNCTIONAL OVERVIEW

Figure 2:
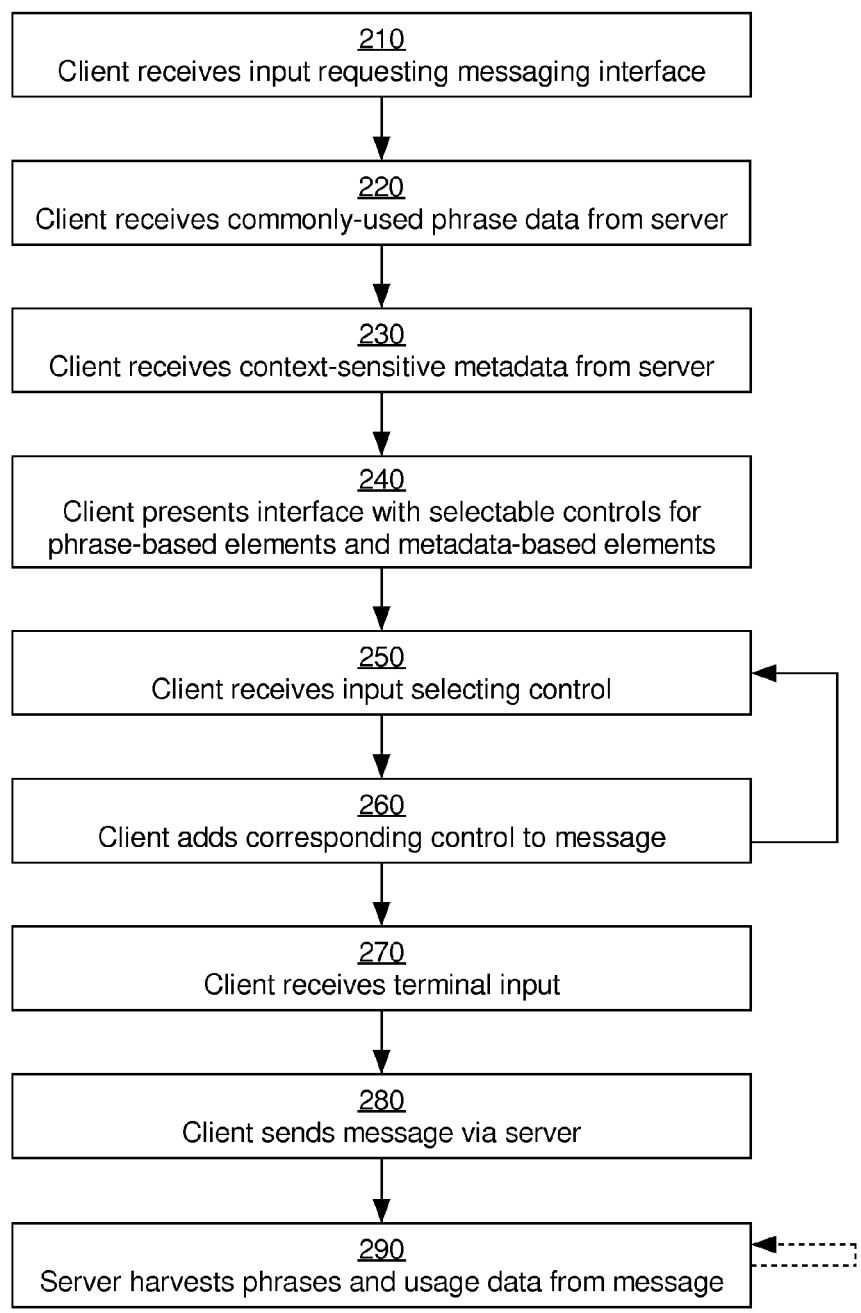
FIG. 2 is a flow diagram 200 illustrating an example process for generating a message via a messaging interface.

FIG. 2 is a flow diagram 200 illustrating an example process for generating a message via a messaging interface.

At block 210, a client device, such as client device 110, receives input indicating a request by a user to generate a message. The input may be received, for example, via a button at an input mechanism, such as input mechanism 112. Or, as another example, the input may be received via the user navigating an on-screen interface and selecting an interface control associated with generating a message. Such a button or control may be labeled, for instance, with an envelope icon, Instant Messaging icon, text such as "TXT," "IM," "Twitter," "Facebook," "Email," and so on.

At block 220, the client device receives data listing commonly-used phrases from a server, such as central server system 130. The list of commonly used phrases may have been generated based at least partially using messages previously sent through the server by other users. Example techniques for generating lists of commonly used phrases are discussed in section 5.3 below, as well as in other sections of this description. In an embodiment, the list is retrieved in response to the input of block 210.

In an embodiment, the client device retrieves the list in response to only certain requests by a user to generate a message. For example, the client device may retrieve a new list every tenth time the user requests to generate the message, or only if a certain amount of time has elapsed since the user last generated a message. In an embodiment, the client device periodically retrieves or receives a new list, for instance, every hour or every day. When the client device does not retrieve a new list in response to the input of block 210, the client device re-uses lists that have been previously retrieved. However, the client may still re-order or filter a re-used list based upon context data and usage trends known to the client device.

In an embodiment, the client device adds each received list to a local data repository of commonly-used phrases. The client device may further receive as part of this step updated usage history data, based upon which the client may select, filter, and order phrases from the local repository.

At block 230, the client device receives context-sensitive metadata associated with one or more activities from a server, such as a server belonging to central server system 130, content provider 140, an event organizer, a content producer, and/or a content distributor. The one or more activities are one or more activities in which the user is currently engaged or about which the user is currently accessing information during or just immediately prior to use of the message generation interface. The metadata received by the client device may include, for instance, metadata such as described in section 5.4 below, as well as throughout this application.

In an embodiment, the metadata is received in response to the input of block 210. The client device sends context information to the server indicating one or more aspects (such as event or content identifiers) of one or more activities. The activities may be known to the client device via a variety of means, such as discussed in section 5.1 below, and in other sections of this description. In an embodiment, the client device may be entirely unaware of any activities in which the user is participating. Instead, the server may be aware of or capable of learning an appropriate context, based on techniques such as described herein. In such embodiments, the client device simply requests that the server provide metadata for the one or more activities already known to the server.

In an embodiment, the client device receives metadata that may be associated with one or more activities prior to the input of block 210, such as in an electronic programming guide. The client device then stores the metadata locally in one or more repositories of metadata. The client device may then retrieve metadata for any appropriate context from local storage in response to the input of block 210. The client device may further receive popularity data to associate with some or all of the metadata, to assist in ordering the metadata by likelihood of use.

At block 240, the client device renders a message generation interface, such as GUI 114, on a display device, such as output device 116. The message generation interface comprises a plurality of user selectable controls, such as controls 118, each corresponding to a different element, or "building block," that may be inserted in the message. At least some of the controls correspond to the commonly used phrases and/or metadata received in blocks 230 and 240. Other controls may correspond to standard ASCII characters and pre-set elements selected by a user or manufacturer, including canned messages and icons. The controls may be of any shape, size, and/or arrangement, and may further include textual or graphical labels indicative of the elements to which they correspond. Some example controls and interfaces are described in section 4.0 below.

At block 250, the client device receives input from the user indicating selection of a control that corresponds to an element that may be added to the message. In response to the input, the client device adds the element corresponding to the selected control to the message being generated. The user may select controls using a variety of means, depending upon which input mechanism the user has available. For example, certain input mechanisms may allow a user to select a control using common "point-and-click" or touchscreen techniques. As another example, when the input mechanism is a traditional remote control, the client device may highlight a certain control to indicate that it is in focus. The user may utilize buttons at the remote control, such as arrow or number buttons, to navigate the interface by changing which control is in focus. Once a desired control is in focus, the user may press a predefined button on the remote control, such as an "enter" or "okay" button, to send input to the client device indicating selection of the desired control.

At block 260, the client device receives input from the user indicating the selection of one or more recipients of the message. Such input may comprise, for instance, selection of one or more controls in the messaging interface corresponding to recipient addresses. For instance, the client device may include in the messaging interface controls corresponding to the addresses of recipients to whom the user commonly sends messages, the addresses of users in a "friend" list for the user, and/or the addresses of users in a social network to which the user belongs. The client device may have previously collected these addresses from the user and/or downloaded these addresses from a server, such as central server system 130 or a server for a social network to which the user belongs.

The input of block 260 may also or instead comprise selection of a "To" control using means such as described above, followed by selection of controls corresponding to the alphanumeric characters of a recipient's address. The interface may include a "wizard" that streamlines the process of composing a recipient's address by, in response to selection of the "to" control, presenting the user with a list of different messaging services, such as Twitter, Facebook, Gmail, and so on. The user may thus compose a recipient's address by entering a user name and selecting an appropriate service.

In an embodiment, the message generation interface includes a field or fields in which the client device displays one or both of the message(s) thus far generated and the intended recipients. Thus, as blocks 250 and 260 are performed, the client device may update the field to include selected elements and recipients. However, the messaging interface need not necessarily display such fields.

Blocks 250 and 260 may be repeated one or more times, thus allowing the user to compose a message comprising a plurality of elements. Repetition of blocks 250 and 260 may occur at any time up until the occurrence of block 270. At block 270, the client device receives a terminal input indicating that the user is done with the message. This input further requests that the client device send the message to the identified recipients. This input may take many forms, including, for instance, selection of an "OK" control in the message generation interface or selection of a "Send" button at the input mechanism.

At block 280, the client device causes the generated message to be sent to the designated recipients. The client device may perform this step in a number of ways, including relaying the message and list of recipients to the server of block 220, as well as sending the message to each of the intended recipients directly.

At block 290, the server of block 220 mines the sent message for phrases, so as to find new phrases to add to its repository of phrases, as well as to adjust popularity scores for phrases and metadata already in its repository(ies). In embodiments where the sent message was not relayed through the server, the client device may report the sent message to the server.

Flow 200 illustrates but one example embodiment of the techniques described herein. Other embodiments may include more or fewer steps, in different orders. For example, the client device may omit block 220 or block 230 to provide an interface that includes only commonly used phrases, or only metadata associated with activities. As another example, blocks 220 and/or 230 may be performed before the input of block 210 as well as after the input of steps 250 or 260. As another example, block 260 may be performed at any time relative to blocks 220-250.

4.0. EXAMPLE INTERFACES

4.1. Example Interface with Word-Based and Icon-Based Elements

Figure 3A:
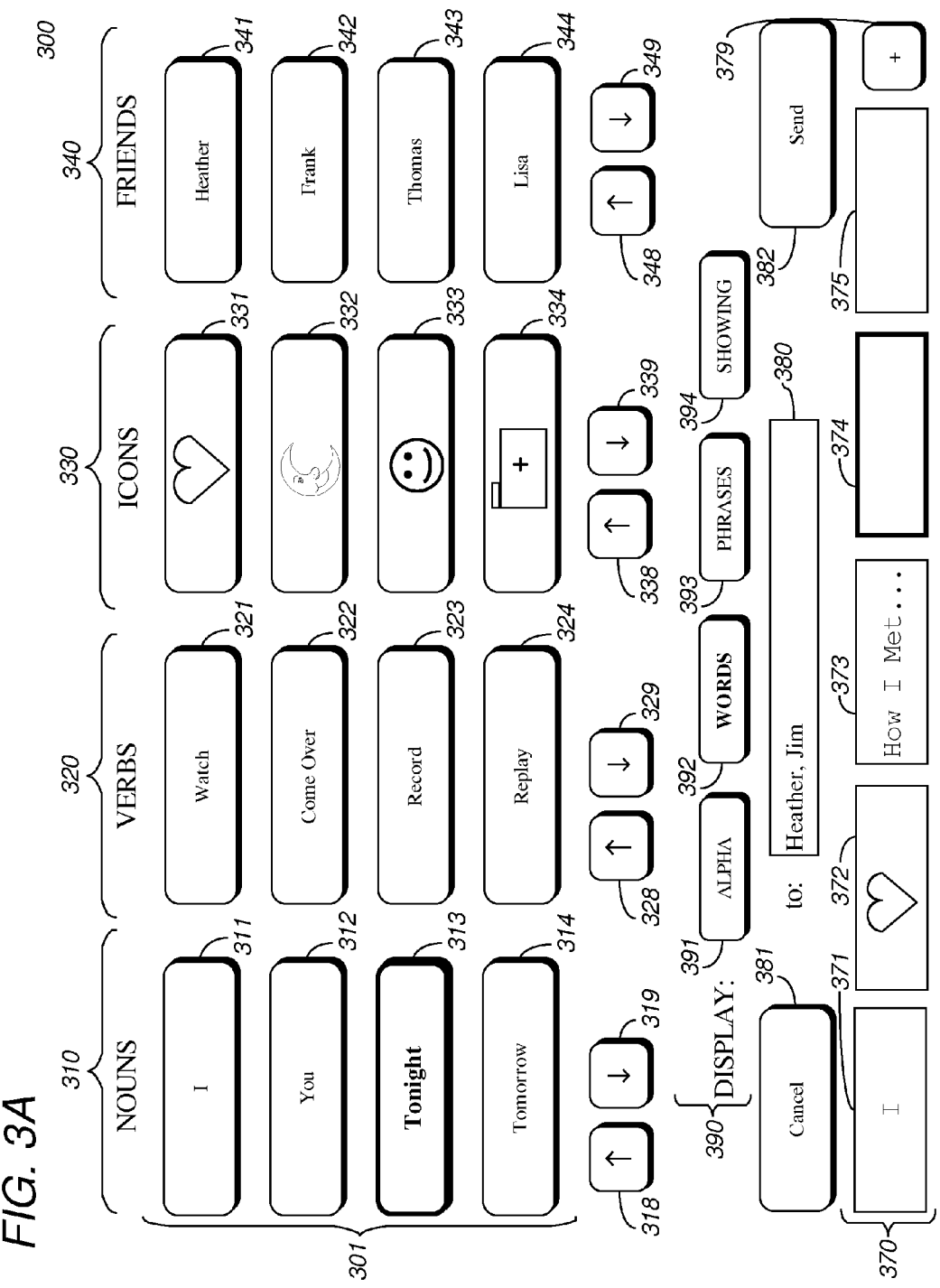
FIG. 3A is a sample view of an example messaging interface 300.

FIG. 3A is a sample view of an example messaging interface 300, according to an embodiment. Messaging interface 300 illustrates but one of many possible techniques by which a client device 110 may implement a GUI 114 for generating message 160. Other messaging interfaces may include more or fewer controls and fields, organized in any variety of arrangements.

Messaging interface 300 comprises a plurality of selectable controls 311-314, 318-319, 321-324, 328-329, 331-334, 338-339, 341-344, 348-349, 379, 381, 382, and 391-394. A user may select these controls using any of a variety of selection techniques, including, without limitation, touch screen input, point-and-click input, input from buttons that have been mapped to designated controls, and so on. One such technique is described in section 4.3, below.

Messaging interface 300 further comprises a building block form 301 for generating a message. Building block form 301 comprises controls 311-314, 321-324, and 331-334, each of which represents a different element that may be added to a message. Each of the controls in building block form 301 are displayed with a visual indication—e.g. text or an image—of its corresponding element. For example, control 313 is labeled with the text "Tonight," thereby indicating that control 313 represents the word "Tonight." As another example, control 331 is labeled with a graphic that resembles a heart. Accordingly, control 331 may represent, for instance, a heart icon, a romantic emoticon, or even a word such as "loves."

Controls 311-314, 321-324, and 331-334 are organized into three different control groups 310, 320, and 330. Each control group represents a different type of element that may be inserted into a message. Control group 310 includes controls representative of "noun" elements. Control group 320 includes controls representative of "verb" elements. Control group 330 includes controls representative of "icon" elements.

In an embodiment, controls 311-314, 321-324, and 331-334 represent elements stored locally in one or more data sources at client device 110. Each element is stored with data indicating the element's type. Controls 311-314, 321-324, and 331-334 may represent pre-defined elements and/or user-defined elements. In an embodiment, some or all of controls 311-314, 321-324, and 331-334 are instead selected from repositories of phrases and/or metadata that have been harvested using techniques as described herein.

When a user selects a particular one of controls 311-314, 321-324, and 331-334, the user indicates his or her selection of the element corresponding to the particular control. Based on this selection, the corresponding element may be added to the message being generated.

Messaging interface 300 further comprises a message display field 370 for indicating to the user the contents of a message as it is being generated. As the user selects controls 311-314, 321-324, and 331-334, the corresponding represented elements are added to the message display field 370. Message display field 370 is further described in section 4.4 below.

Messaging interface 300 further comprises a recipient block form 340 and a recipient display field 380. Recipient block form 340 comprises controls 341-344, each of which represents a different potential recipient or group of recipients. The potential recipients or groups of recipients represented may be selected from a contact database. This contact database may be stored local to client device 110 or at any other suitable location. The contact database may have been compiled using any of a variety of means, such as direct user input, recipient harvesting from previous messages sent by the user, and/or importation from an email service or social network. The user may, at any time, select one or more of controls 341-344. In response, the recipient(s) represented by the selected control(s) are added to a list of intended recipients. This list of intended recipients is displayed to the user via recipient display field 380.

In an embodiment, the user may select recipient display field 380. In response to this selection, the user may be presented with a mechanism for deleting recipients and/or manually entering the address of a recipient.

When the user has completed the message, the user may select send control 382 to indicate that the message is complete. Upon receiving input indicating selection of send control 382, client device 110 may take any suitable action to cause the generated message to be sent to the selected recipients. Alternatively, should the user decide not to send the generated message, the user may select cancel control 381.

4.2. Scrolling Interface Controls/Switching Input Modes

In an embodiment, at any given time, only a portion of the controls available to a rendered interface will be visible on the display device. For example, interface 300, as depicted in FIG. 3A, displays to the user only a limited number of building block controls 311-314, 321-324, and 331-334 and recipient block controls 341-344. However, many more elements or recipients are available for selection. For simplification of the interface, at any given time, interface 300 may display controls for only a portion of the available message elements and recipients. Controls for the remaining elements and recipients are not displayed.

Interface 300 is therefore configured to dynamically swap in hidden controls. For example, scrolling controls 318-319, 328-329, 338-339, and 348-349 may be used to swap in new controls for control group 310, control group 320, control group 330, and recipient block form 340, respectively. The controls may be swapped in according to any suitable order, including orders based on frequency of use, randomness, and predicted usefulness. The controls displayed initially in interface 300 may also be selected based on these and other factors, or the initial controls may correspond to the controls last displayed during the immediately previous instantiation of interface 300.

Moreover, interface 300 comprises a mode switching form 390, which in turn comprises controls 391-394. Controls 391-394 each represent a different input mode for interface 300. For each input mode, interface 300 presents different types, arrangements, and/or numbers of controls. For example, control 391 represents an alphanumerical input mode, in which interface 300 presents keyboard-like controls for selection and insertion into the generated message. The control representing the current input mode may be highlighted. Thus, as depicted in FIG. 3A, interface 300 is operating in a "words" mode, which mode is represented by control 392.

For convenience, any control that could, through user interaction with interface 300, be rendered in interface 300, is herein said to be part of interface 300 or included in interface 300, even though the control is not necessarily ever displayed to the user. Suitable user interaction for causing a control to be rendered may include any suitable user input, including selection of scrolling, mode-switching, or like controls, as explained above.

4.3. Example Technique for Selection of Controls

According to an embodiment, a user may select some or all of the controls in interface 300 via navigational input that brings a control into focus, followed by input that indicates selection of the control currently in focus. At any given time, one of the plurality of selectable controls is highlighted, or "in focus." As depicted in FIG. 3A, for example, control 313 is in focus. In an embodiment, a control that is in focus may be displayed in a different manner than other controls, thereby indicating to the user that the control is in focus. For example, control 313 is displayed with both bolded text and a bolded border. However, in other embodiments, a control may be indicated as being in focus using any suitable visual effect, such as a color change, shape change, and/or glowing effect.

While a particular control is in focus, the user may indicate selection of the highlighted control by submitting a designated input. For example, the user may press an "Enter," "OK," or like button. In response to this input, the element represented by the highlighted control is added to the message.

4.4. Example Message Display Field

As depicted in FIG. 3A, message display field 370 is subdivided into blocks 371-375, each of which corresponds to an element that has been added or may be added to the message. However, message display field 370 need not be subdivided. In an embodiment, the number of blocks in message display field 370 is pre-fixed. In an embodiment, a new block is added to message display field 370 any time the user selects an element to add to the message. In an embodiment, blocks may be added to message display field 370 dynamically, via selection of control 379. In an embodiment, the block into which the next selected element is to be inserted is displayed as being "in focus." For example, block 374 is highlighted to indicate that it is in focus. In an embodiment, the user may change which block is in focus by selecting a different block using any suitable control-selection technique. In this manner, blocks with currently assigned elements may be overwritten.

If the message grows too large for message display field 370, certain elements may be hidden from field 370. In an embodiment, interface 300 may further include controls that allow the user to bring hidden elements into view. In an embodiment, hidden elements are brought into view automatically, either in response to navigational input submitted by the user while message display field 370 is in focus, or in response to the passage of a certain amount of time, so as to yield a ticker effect.

4.5. Example Interface with Phrase-Based Elements

Figure 3B:
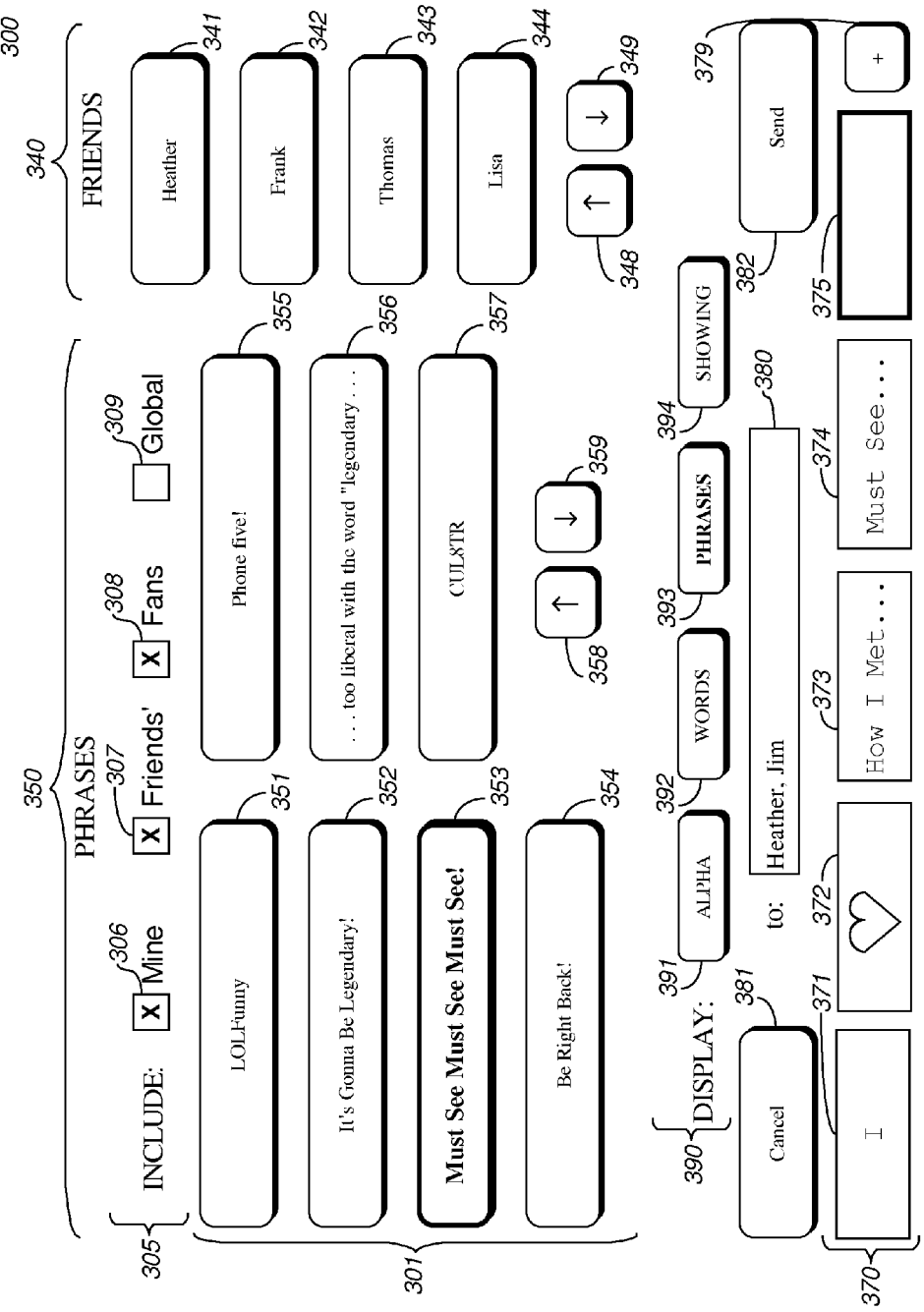
FIG. 3B is another sample view of example messaging interface 300.

FIG. 3B is another sample view of example messaging interface 300, according to an embodiment. FIG. 3B is, for the most part, similar to FIG. 3A, except that interface 300 is depicted as operating in a "phrases" input mode, as indicated by highlighted input mode control 393.

As depicted in FIG. 3B, building block form 301 of interface 300 comprises a control group 350 corresponding to a "phrase" element type. Control group 350 comprises controls 351-357, each of which represents a different phrase element that may be inserted into the message being generated. Control 353 is currently in focus. Controls 351-357 may represent any of the following combinations of elements: 1) pre-defined canned phrases; 2) user-defined canned phrases; 3) phrases derived from context-sensitive metadata; and 4) phrases learned from previous messages. Each of these elements may be retrieved from a local data repository or from a centralized server system.

Controls 351-355 and 357 are labeled with the entire texts of their respective represented phrases. However, for lengthy phrases, such as represented by control 356, a control may only be labeled with a portion of the text for a phrase. In an embodiment, the text label of control 356 automatically scrolls over time to allow the user to read the full phrase. The automatic scrolling may occur constantly, or only when control 356 is in focus.

Control group 350 further comprises a filtering form 305, which in turn comprises filtering controls 306-309. Filtering form 305 allows a user to select different categories of phrases to include in building block form 301. When filtering control 306 is selected, for instance, building block form 301 may include controls that represent phrases harvested from messages sent by or to the user. When filtering control 307 is selected, building block form 301 may include controls that represent phrases harvested from messages sent by or to users that have been identified as "friends" of the user. When filtering control 308 is selected, building block form 301 may include controls that represent phrases harvested from messages sent by or to users that have been identified as "fans" of an activity in which the user is currently engaged or content that the user is currently viewing. When filtering control 309 is selected, building block form 301 may include controls that represent phrases harvested from messages sent by or to all users of a central server system through which the user relays messages.

In an embodiment, some or all of the above filtering conditions may further involve constraining or prioritizing phrases to the context of a certain activity in which the user is presently engaged. For example, the user may be watching a certain television show. While also watching the television show, other users may have sent messages that included famous quotes from the television show. These quotes may be automatically harvested from those messages and then utilized as elements in interface 300. The quotes may be given preference or even exclusively selected over other phrases harvested from phrases used outside of the context of the activity. Note that constraint or prioritization based on such a context may be implicit, or may be selected via one or more additional controls.

In some embodiments, filtering form 305 comprises more or fewer filtering controls, while in other embodiments, interface 300 may lack filtering form 305 altogether.

Control group 350 further comprises controls 358-359 for scrolling to hidden controls, like the scrolling controls discussed in section 4.2 above.

Additional differences between FIG. 3A and FIG. 3B include: block 374 is no longer highlighted, but includes the text "must see . . . "; and block 375 is highlighted. These changes may have resulted, for example, from the user's selection of control 353 while block 374 was highlighted. In response to this selection, client device 110 may have added the phrase element "Must See Must See Must See!" to the message in the position of block 374. Note that the text displayed in block 374 has been abbreviated due to size constraints. In an embodiment, this text may periodically scroll so as to reveal the entire text of the element. Further in response to the selection of control 353 while block 374 was highlighted, the client device may have automatically shifted the focus of message display field 390 to the next empty block, in this case block 375.

4.6. Example Interface with Metadata-Based Elements

Figure 3C:
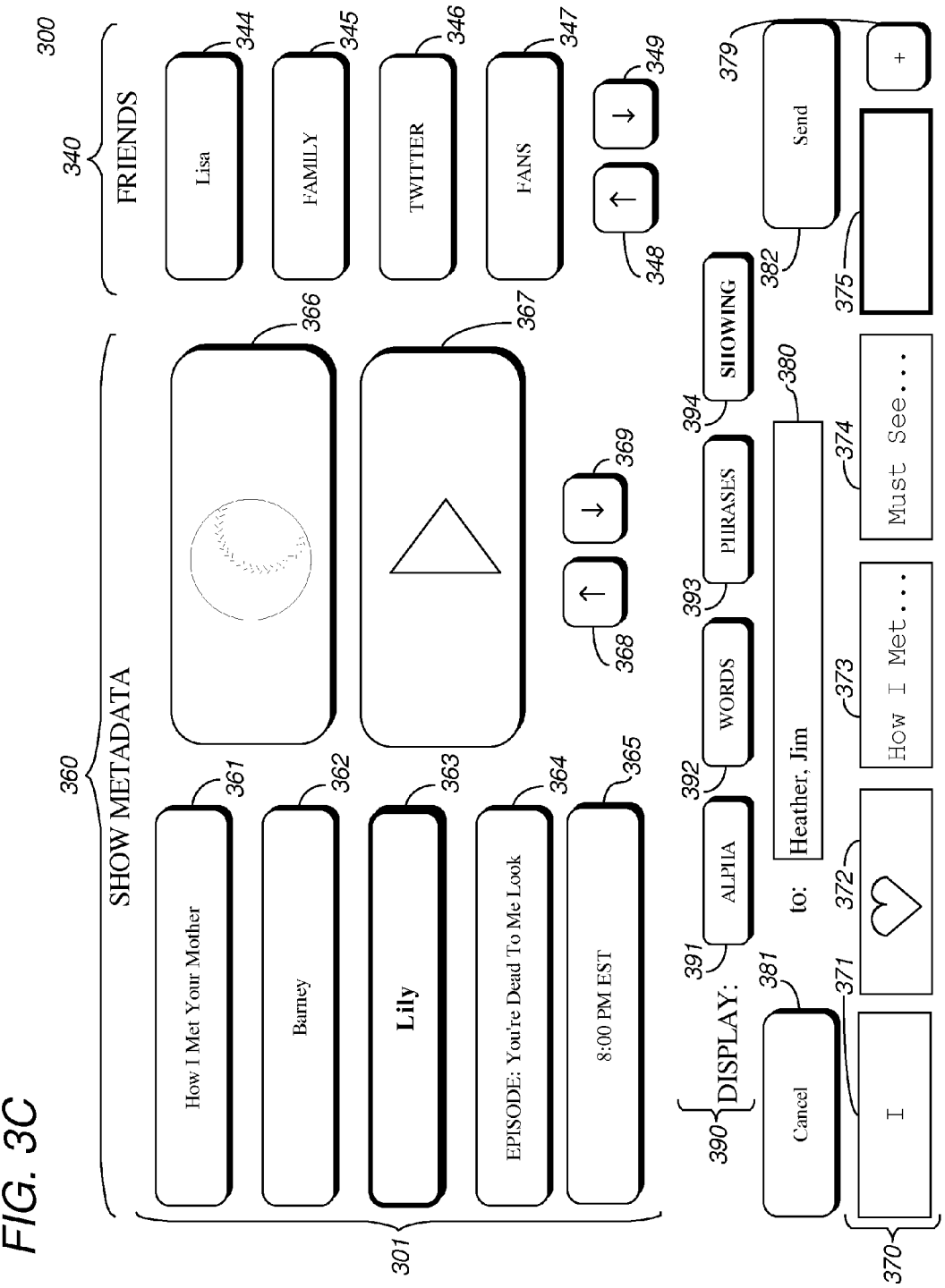
FIG. 3C is another sample view of an example messaging interface 300.

FIG. 3C is another sample view of an example messaging interface 300, according to an embodiment. FIG. 3C is, for the most part, similar to FIG. 3A. However, interface 300 is depicted as operating in a "metadata" input mode, as indicated by highlighted input mode control 394.

As depicted in FIG. 3C, building block form 301 of interface 300 comprises a control group 360 corresponding to a "metadata" element type. Control group 360 comprises selectable controls 361-367, each of which represents a different metadata element that may be inserted into the message being generated. Control 363 is currently in focus.

Controls 361-367 may represent any metadata elements associated with an activity in which the user is currently engaged. The metadata may pertain to any aspect of the activity. For example, the activity of FIG. 3C involves an episode of a television show. Other example metadata elements are described in section 5.4.

In an embodiment, some or all of the metadata elements are selected from a local data repository containing information provided by a content or metadata provider. For example, client device 110 may select the metadata elements from an electronic programming guide populated with data provided by content provider(s) and/or a central server system, such as system 130. In an embodiment, client device 110 automatically requests some or all of the metadata elements associated with an activity from a content or metadata provider, in response to the user launching interface 300 while participating in the activity.

As with FIGS. 3A and 3B, interface 300 displays controls for only a small number of the available metadata elements. Controls 368 and 369 may be used to scroll in controls for other metadata elements.

In an embodiment, interface 300 may enhance controls that represent non-textual elements, such as controls 366 and 367, using a number of techniques. For example, when the user brings a control that represents an image into focus, such as control 366, interface 300 may temporarily enlarge the image. Or, where control 366 is labeled with a cropped version of an image, interface 300 may display the full image in an enlarged format as the user brings control 366 into focus. As another example, when the user brings a control representing an audio or video element into focus, such as control 367, interface 300 may play the audio or video element. For example, control 367 may represent a video preview or recap of a television episode, which interface 300 may play when the user highlights control 367.

An additional difference between FIG. 3B and FIG. 3C is the inclusion of new controls 345-347 in place of controls 341-343 in recipients block 340. Control 345 represents an element corresponding to a user-defined group of recipients labeled "Family." Control 346 represents an element corresponding to a group of recipients labeled "Twitter." For example, selection of this control may indicate that the user wishes to send the generated message to his or her Twitter account, from which it may be accessed by a subscribed group of recipients. Control 347 represents an element corresponding to a group of recipients labeled "Fans." For example, selection of this control may indicate that the user wishes to send the generated message to other users who have indicated that they are a fan of the television show that the retrieved metadata elements describe.

4.7. Example Interface with Integrated Programming Guide

Figure 4:
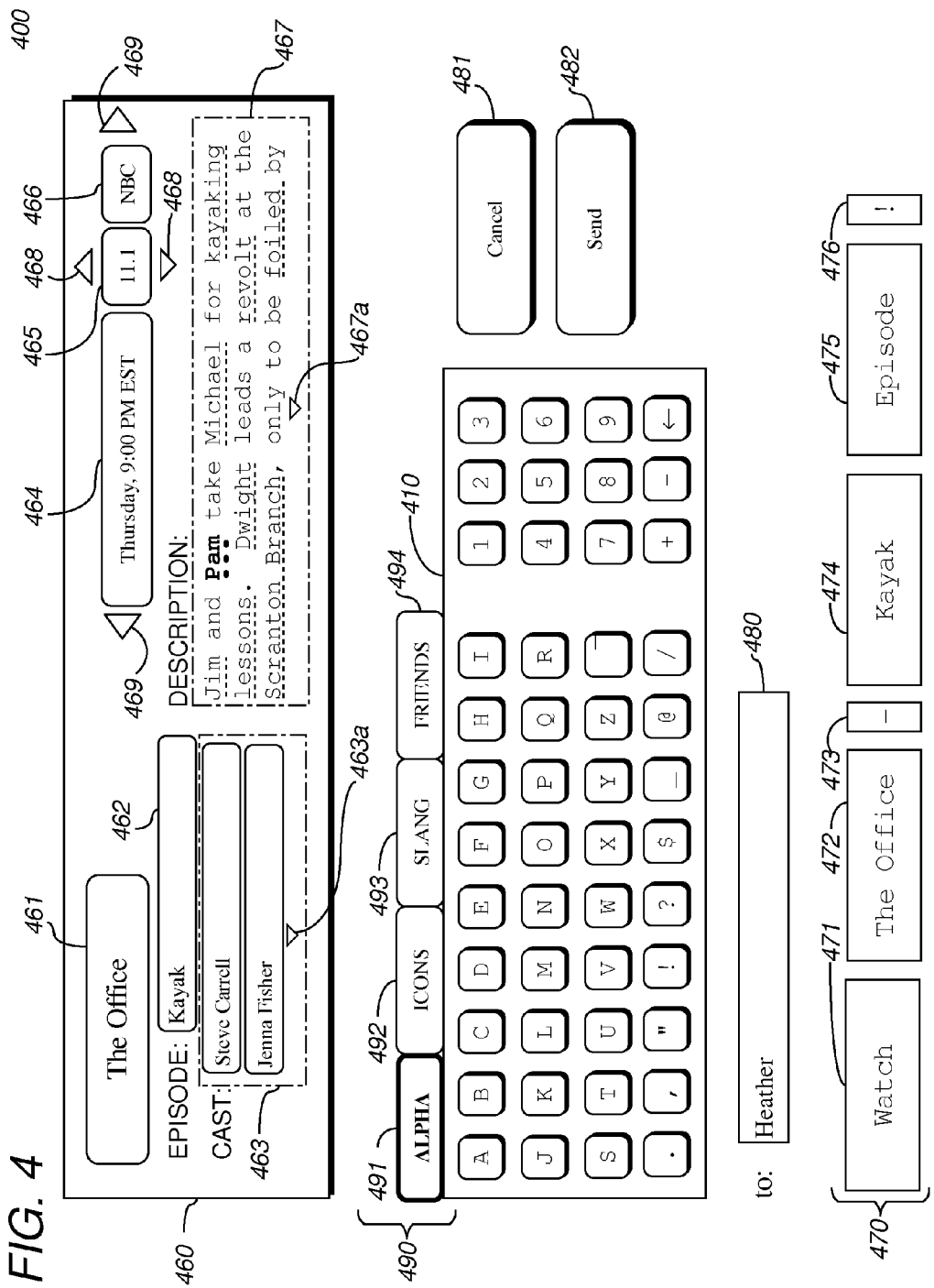
FIG. 4 is an example message generation interface 400 with an integrated programming guide.

FIG. 4 is an example message generation interface 400 with an integrated programming guide, according to an embodiment. Messaging interface 400 illustrates but one of many possible techniques by which a client device 110 may implement a GUI 114 for generating message 160. Other messaging interfaces may include more or fewer controls and fields, organized in any variety of arrangements.

Messaging interface 400 comprises an information panel 460 to assist a user in composing a message. Information panel 460 displays information about an event—in this case, an episode of a television series. The user may quickly locate this information and add it to the generated message. In an embodiment, information panel 460 appears persistently in interface 400. In an embodiment, information panel 460 is by default hidden from interface 400 to make room for other controls, such as described throughout this disclosure. However, in such an embodiment, information panel 460 may be brought up at any time via selection of, for instance, an interface control in interface 400 or a "Guide" button on input mechanism 112.

Information panel 460 comprises a number of controls and fields 461-469. Control 461 represents a metadata element corresponding to the name of the television series. Control 462 represents a metadata element corresponding to the title of the episode. Controls 463a and 463b represent metadata elements corresponding to cast members of the television series. Control 464 represents a metadata element corresponding to the air date and time of the episode. Control 465 represents a metadata element corresponding to the channel number on which the episode will air. Control 466 represents a metadata element corresponding to the name of the broadcast network on which the episode will air. In response to a user selecting any one of controls 461, 462, 463a, 463b, 464, 465, and 466 by the user, interface 400 adds the respective represented element to the generated message.

Field 467 includes a description of the episode. Various elements of the description are underlined, thereby indicating that the underlined portions are themselves selectable controls. For instance, the user may select any of the following elements from the description to the message: "Jim," "Pam," "Michael," "kayaking lessons," "Dwight," "revolt," "Scranton Branch," or "foiled." Client device 110 may have decided to render these elements of field 467 as selectable for a variety of reasons. For example, the metadata itself may have included markups indicating that above-listed elements in the description should be emphasized. As another example, client device 110 or central server system 130 may include one or more global or context-sensitive databases of terms that should be emphasized in textual descriptions. Such a database may be static, or may change over time based on an analysis of messages sent by users. As yet another example, client device 110 may include logic for analyzing textual descriptions grammatically, semantically, and/or syntactically to identify significant markers. In some embodiments, field 467 is itself a selectable control. In such embodiments, in response to selection of field 467, the entire description may be inserted into the message.

Controls 463c and 467a permit a user to scroll to addition cast members and textual descriptions, respectively. Controls 469 permit a user to navigate to a different television show in an adjacent time slot on the same channel. Controls 468 permit a user to navigate to a different television show in the same time slot but on another channel. Information panel 460 may include more or fewer controls for navigating to other events. Moreover, the types of information and controls depicted in FIG. 4 are merely illustrative of the many types of information and the many types of selectable controls that may be included in information panel 460. In an embodiment, for example, information panel 460 may include controls representing phrases commonly used by other users while watching the indicated program.

Interface 400 comprises an alphanumerical control form 410, in which the user may select alphanumerical characters to insert into the message. In an embodiment, each alphanumerical character is considered a separate element of the message. In an embodiment, consecutively selected alphanumerical characters are grouped together as a single element, which element may be harvested from the message and subsequently utilized as the basis of a phrase-based control.

Interface 400 further comprises a mode switching form 490, similar to mode switching form 390 of FIGS. 3A-3C. Mode switching form comprises controls 491-494, each of which represents a different input mode for interface 400. For each input mode, interface 400 presents different types, arrangements, and/or numbers of controls. For example, highlighted control 491 represents an alphanumerical input mode, in which interface 400 presents the keyboard-like alphanumerical control form 410. In other modes corresponding to other controls 492-494, alphanumerical control form 410 is replaced by forms for inserting icons into the message, inserting slang phrases harvested from other users, and selecting recipients, respectively. Additional modes are also possible.

Interface 400 further comprises: a recipient display field 480, similar to recipient display field 380; a send control 482, similar to send control 382; a cancel control 481, similar to cancel control 381; and a message display field 470, similar to message display field 370 of FIGS. 3A-3C. Message display field 470, in turn, comprises blocks 471-476, which correspond to elements selected by the user to insert into the message.

5.0. EXAMPLE IMPLEMENTATION DETAILS

5.1. Context Awareness

In an embodiment, one or both of client device 110 and central server system 130 employs any of a variety of techniques to identify a context in which the messaging interface 114 is being used. Based on this context, the interface may be customized to include controls for context-based metadata elements. Additionally, or in the alternative, controls may be ranked based on the context, so that the phrases most likely to be useful within the context appear with minimal (or without any) scrolling.

In an embodiment, the context is identified by determining one or more activities in which the user is participating at the time the user requested access to the interface. Once these activities have been determined, any of a variety of aspects of the activities may yield metadata for interface controls, as previously discussed. Additionally, or in the alternative, data describing any of a variety of aspects of the activities may be compared to historical usage data collected for commonly used phrases to determine which of the phrases are most relevant to the current context.

In an embodiment, context awareness at central server system 130 is facilitated by context awareness at client device 110. Client device 110 is aware of at least some aspects of an activity in which the user is participating simply because client device 110 is instrumental in that activity. For example, in the case that client device is a media or entertainment device, the activity may involve watching or accessing information about certain content through client device 110 itself. Client device 110 may relay information identifying that content to central server system 130. Central server system 130 may then use the content-identifying information to lookup suitable metadata and/or rank phrases for return to client device 110.

By the same token, when client device 110 is already aware of content-identifying information, client device 110 may itself utilize that information to lookup suitable metadata and/or rank phrases in a local data repository. Client device 110 may have populated this local data repository from metadata and/or phrases received periodically from content providers 140 or central server system 130. Furthermore, each entry of metadata and/or phrases in the local data repository may have been stored in association with context data, such as content identifiers or activity identifiers. In the case of phrases, for instance, the context data may associate a frequency of use for each phrase with each of a plurality of context identifiers. Client device 110 may utilize this stored context data to assist in its selection and ranking of metadata and phrases.

In an embodiment, client device 110 is simply made aware of an activity, without user 105 explicitly using client device 110 to participate in or access information about the activity. For example, client device 110 may be a touch screen control panel or smartphone. Client device 110 may retrieve information indicating the current activity from another device, such as a digital video recorder, via Bluetooth, WiFi, or similar technologies. Or, as another example, client device 110 may utilize data from user input, calendar items, sensors, and/or location services to look up an appropriate activity in a database.

Alternatively, client device 110 may rely upon central server system 130 to determine the activity on its own. For example, central server system 130 may be sending an audio or video stream to client device 110, and thus be aware of the content being shared in that stream. In such an embodiment, central server system 130 requires no information from client device 110 to be able to select metadata or rank phrases based on said content. In fact, in such an embodiment, central server system 130 may be responsible for sharing content identifiers with client device 110, as needed by client device 110 to perform context-aware tasks. Or, client device 110 may be left entirely unaware of the context identifying information known to central server system 130. Central server system 130 may also determine context from, among other considerations, the afore-mentioned data from user input, calendar items, sensors, and/or location services.

5.2. Harvesting Phrase Data from Messages

In an embodiment, any device that sends, receives, or relays messages may harvest those messages for phrases to add to a repository of phrases. Phrases may be of any length, up to and including the length of the entire message. The device may be configured to identify phrases using grammatical, semantic, syntactic, or any other suitable clues. For example, the device may identify every word as a separate phrase. As another example, the device may identify every clause as a phrase. The device may further identify the same portion of the message as being part of several phrases. For example, from the phrase "You have to see it to believe it," the device may identify, among other phrases, some or all of the following phrases: "you have to," "see it," "believe it," "see it to believe it," "you have to see it," and "You have to see it to believe it." For each identified phrase that is not already in the relevant phrase repository, the device adds the identified phrase to the repository.

In an embodiment, for each phrase identified in a message, a device may further update a usage history associated with the repository of phrases, regardless of whether the phrase is new to the repository of phrases. For example, the device may maintain a usage history indicating the number of times each phrase has been used. In an embodiment, the device may also or instead maintain a popularity score that is weighted over time, so that more recent uses of the phrase impact the score more than older uses of the phrase. The usage history may further include data indicating the number of times each phrase has been used within one or more contexts, as identified through the techniques discussed above. Alternatively, a separate phrase repository may be maintained for each context.

In an embodiment, any device that collects phrase data as described above may share some or all of that data with other devices in a messaging network to assist those devices in building their own data repositories for generating messaging interfaces. For example, central server system 130 may periodically send updated phrase data for storage at client device 110. As another example, client device 110 may periodically share updated phrase data with central server system 130 and/or other client devices operated by other users.

5.3. Selecting Phrases for Inclusion as Phrase-Based Elements

When a device, such as client device 110 or central server 132, generates a list of commonly used phrases for use as phrase-based elements in a messaging interface, the device may filter or rank the phrases, so as to ensure that the phrases most likely to be relevant to a user are more easily accessible (e.g. with minimal scrolling) in the interface. Thus, while in certain embodiments central server 132 may generate a list of commonly used phrases simply by retrieving all phrases from data repository 134, in other embodiments, central server 132 may select only those phrases whose usage histories match certain criteria. For example, selection may be limited only to those phrases that have a certain popularity score or higher. As another example, selection may be limited only to those phrases that have been used in a certain context. In an embodiment comprising multiple data repositories, having a different phrase repository for each of a plurality of contexts, selection may be limited only to phrases appearing in the repository associated with a current context. In an embodiment, the selected phrases are also ordered based at least partly upon popularity or context data.

For example, a group of users may frequently exchange messages comprising the phrase "BwrDrgn!" while playing a video game named "Warcraft," but use the phrase infrequently elsewhere. Central server system 130 may have harvested this phrase using the above described techniques, and further compiled a usage history for the phrase. If user A were to launch a messaging interface while watching a newscast, central server system 130 would either rank the phrase very low, or not select the phrase at all. Thus, if at all, user A would only be presented with a selectable control corresponding to the phrase "BwrDrgn!" after much scrolling. By contrast, if user B were to launch the messaging interface while playing "Warcraft" or a similar video game, central server system 130 would rank the phrase highly. Thus, user B would be presented with a selectable control corresponding to the phrase after much less scrolling, if any.

5.4. Context-Sensitive Metadata

As used herein, metadata may be described as being associated with an activity if the metadata is data or any other type of information that describes or illustrates any aspect of the activity. Aspects of an activity may include, without limitation, events, viewable or audible content involved in the activity, times, dates, participants, locations, sponsors, fees, and so on. Metadata elements may take the form of alphanumerical characters, symbols, words, phrases, images, videos, audio, and/or calendar objects.

For example, metadata elements associated with the activity of watching a television show activity may be derived from metadata for the television show, including, without limitation, a series name (e.g., control 361), an episode name (e.g., control 364), an episode number, an air date and/or time (e.g., control 365), an original broadcast date, character names (e.g., controls 362 and 363), images (e.g., control 366), audio or video clips (e.g., control 367), the names of actors, actresses, writers, directors, and/or producers, and so on. Similar metadata elements may be associated with watching a movie or listening to music.

5.5. Dynamic Interface Layout Based on Predicted Next Elements

In an embodiment, a client device may automatically change the layout of a messaging interface after certain elements are inserted into the message, based on filters such as grammatical rules and/or usage patterns. The rules or filters may be used to predict which elements or types of elements will likely follow one or more of the previously entered elements. Accordingly, the interface may be customized after each element is selected, so that the types of elements predicted to come next are more readily accessible for selection.

As a simple example, the last selected control may automatically be scrolled out of view in interface 300, based on the assumption that the control is not likely to be selected twice in a row. As another example, after the user selects a "noun" control from control group 310 of interface 300, control group 320 (representative of verbs) may be swapped into the place of control group 310, based on the assumption that a verb will most likely be selected after a noun. In fact, in an embodiment, only one control group is shown at any given time, but the control group is rotated into the interface based on the afore-mentioned predictions. Mode switching controls similar to controls 391-394 may be used to swap in the desired controls when the prediction is incorrect.

In an embodiment, the actual layout of the messaging interface may remain the same, but the control that is in focus may automatically change to a different control group. In an embodiment, controls may be re-ordered after each selection, based on scores or rules predicting the likelihood of each corresponding element occurring after the previous one or more elements. This re-ordering will often result in an entirely new set of controls being swapped into view.

In some embodiments, each message is generated according to one of one or more message templates. For example, the message template may dictate which types of elements can be inserted at what position in the message. One template may dictate, for instance, a simple pattern of pronoun-verb-subject. Many other templates are also possible. In such embodiments, the layout may change after the insertion of one element so as to prioritize those controls that represent the next type of element in the template. In an embodiment, a user may select between multiple templates at any time while composing a message.

5.6. User of Selection of an Activity from within the Message Generation Interface In an embodiment, the client device retrieves context-sensitive metadata-based elements in response to input received after the client has already rendered a message generation interface. In such an embodiment, the user may identify a context after launching the messaging interface. For example, information panel 460 of interface 400 allows a user to select different contexts (e.g., different television shows) from within a messaging interface. As another example, a messaging interface may allow a user to select a calendar date. In response to selection of the calendar date, controls representing metadata associated with that date may be inserted into the interface. The interface may be updated any time the user selects a new context, both to add new metadata and to filter or re-order phrase-based elements.

5.7. Implementation in Non-Centralized Environments

In some embodiments, some or all of the functions described herein as being performed by central server system 130 may instead be performed by client device 110, including the sending of messages and the harvesting of phrases. For example, client device 110 may build its own phrase repository and usage history based at least partly on messages previously received at client device 110 from other users. Client device 110 may further include its own repository of context-sensitive metadata, which metadata may or may not be periodically updated based on data received from content providers 140. Based on these repositories of phrases and metadata, client device 110 may therefore be entirely capable of performing some or all of the techniques described herein for selecting and ordering elements.

In such embodiments, the usefulness of locally-stored phrase repositories and usage histories may be further enhanced by having each client device share its phrase repository(ies) and usage history(ies) with other client devices. This sharing may be accomplished by a variety of synchronization or distributed sharing techniques.

6.0. IMPLEMENTATION MECHANISM-HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
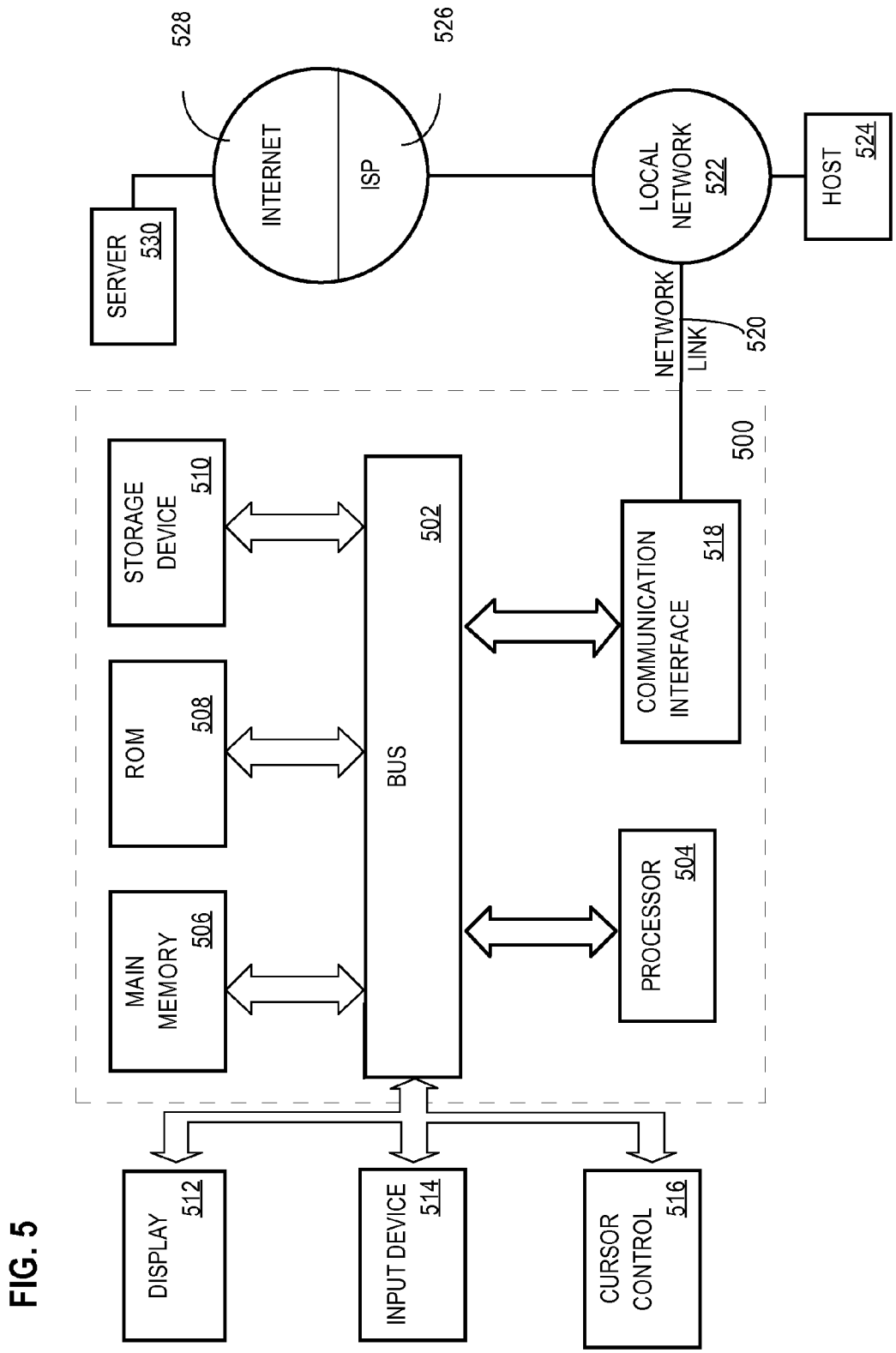
FIG. 5 is block diagram of a computer system upon which embodiments of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

7.0. EXTENSIONS AND ALTERNATIVES

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

According to an embodiment, a method comprises: displaying a user interface comprising a first set of elements; wherein the first set of elements is a set of elements that has been selected based at least partially upon one of: a) data indicating phrases that have been identified in messages previously generated by a plurality of users; or b) metadata associated with an activity in which the user is participating while the interface is being presented or immediately prior to the interface being presented; receiving first input from a user, the first input selecting a first element in the first set of elements for inclusion in a message; receiving one or more additional inputs from the user, the one or more additional inputs specifying one or more additional elements of the message; generating a message based on at least combining the first phrase and the one or more additional elements.

In an embodiment, the first set of elements has been selected based at least partially upon the metadata associated with an activity in which the user is participating while the interface is being presented or immediately prior to the interface being presented.

In an embodiment, the method is performed by a digital video recorder; the activity is one of: viewing particular content or accessing information about particular content; the metadata is related to the particular content.

In an embodiment, the method further comprises retrieving the metadata from a repository of data for an electronic programming guide.

In an embodiment, the first set of elements has been selected based at least partially upon the data indicating phrases that have been identified in messages previously generated by the plurality of users.

In an embodiment, the first set of elements is ranked based at least partially upon their frequency of use by the plurality of users.

In an embodiment, the first set of elements is ranked based at least partially upon their frequency of use within a specific context, the specific context being associated with an activity in which the user is participating while the interface is being presented or immediately prior to the interface being presented.

In an embodiment, the one or more additional elements also include at least one element from the first set of elements.

In an embodiment, the method is performed by a client device, further comprising the client device receiving the first set of elements from a server.

According to an embodiment, a method comprises: sending, to a plurality of clients, a plurality of phrases for use as elements in messaging interfaces; receiving a message from a user at one of said plurality of clients, said message being addressed to at least one recipient; causing the message to be sent to the at least one recipient; based on an analysis of the message, identifying a phrase in the message, wherein the phrase was not in the plurality of phrases; sending the phrase to the plurality of clients for use as an element in the messaging interfaces.

In an embodiment, the method further comprises: based on the analysis of the message, further updating popularity data for the plurality of phrases; based on the updated popularity data, performing one or more of: sending the updated popularity data to the plurality of clients; or sending a revised plurality of phrases to the plurality of clients, wherein the revised plurality of phrases was selected or ordered based upon the updated popularity data.

In an embodiment, the method further comprises: identifying a first context in which the message was sent by the user; wherein the popularity data is relevant to the first context, but not a second context.

According to an embodiment, an apparatus comprises: one or more processors; a network interface configured to send messages; an input interface configured to receive input from an input mechanism; wherein the one or more processors are configured to cause a display mechanism coupled to the apparatus to present video content, or information about said video content, to a user; wherein the input interface is configured to receive input requesting the apparatus to present a graphical interface for generating a message; wherein the one or more processors are configured to cause the display mechanism to present the graphical interface, wherein the graphical interface comprises a first set of elements; wherein the first set of elements is a set of elements that has been selected based at least partially upon one of: a) data indicating phrases that have been identified in messages previously generated by a plurality of users while watching or accessing information about said video content; or b) metadata associated with said video content; wherein the input interface is configured to receive first input from the user via the input mechanism, the first input selecting a first element in the first set of elements for inclusion in a message; wherein the input interface is further configured to receive one or more additional inputs from the user via the input mechanism, the one or more additional inputs specifying one or more additional elements of the message; wherein the one or more processors are further configured to generate the message based on at least combining the first phrase and the one or more additional elements; wherein the network interface is configured to send the message.

What is claimed is:

1. An apparatus comprising:
  a network interface configured to send messages;
  one or more processors configured to identify media content that has been at least partially played at a media playback device within a recent period of time;
  a display mechanism configured to display, within a message composition interface, an arrangement of phrases selected based on the identified media content;
  an input mechanism configured to receive selection input that selects a particular phrase from the arrangement;
  wherein the one or more processors are further configured to insert the particular phrase into a message being composed within the message composition interface responsive to the input mechanism receiving the selection input;
  wherein the network interface is further configured to receive, from a server system, metadata describing the identified media content;
  wherein the one or more processors are further configured to select at least one of the phrases for inclusion in the arrangement from the metadata describing the identified media content, including at least one of: a title, actor or actress name, writer name, air date or time, channel, clip, or image.

2. The apparatus of claim 1:
  wherein the input mechanism is further configured to receive, from a remote control device, navigational inputs corresponding to arrow buttons;
  wherein the display mechanism is further configured to, responsive to the navigational inputs, change which particular phrase in the arrangement is in focus;
  wherein the selection input selects the particular phrase that is in focus.

3. The apparatus of claim 1, further comprising:
wherein the network interface is further configured to receive, from a server system, at least a first phrase and an indication that the first phrase has been used in a first message sent by a first user within a certain period of time after a first media playback device associated with the first user played at least a first portion of the identified media content;
wherein the one or more processors are further configured to select the first phrase for inclusion in the arrangement because of the indication.

4. The apparatus of claim 1, further comprising:
wherein the network interface is further configured to receive, from a server system, popularity scores for at least a first set of phrases, relative to the identified media content;
wherein the one or more processors are further configured to generate the arrangement based at least on the popularity scores.

5. The apparatus of claim 1, further comprising:
wherein the network interface is further configured to receive, from a server system, data associating at least some of the phrases with the identified media content;
wherein the network interface is further configured to send the message through the server system.

6. One or more non-transitory computer-readable media, storing instructions that, when executed by one or more computing devices, cause performance of:
identifying media content that has been at least partially played at a media playback device within a recent period of time;
presenting, within a message composition interface, an arrangement of phrases selected based on the identified media content;
receiving selection input that selects a particular phrase from the arrangement;
responsive to the selection input, inserting the particular phrase into a message being composed within the message composition interface;
receiving, from a server system, metadata describing the identified media content;
selecting at least one of the phrases for inclusion in the arrangement from the metadata, including at least one of: a title, actor or actress name, writer name, air date or time, channel, clip, or image.

7. The one or more non-transitory computer-readable media of claim 6, wherein the instructions, when executed by the one or more computing devices, further cause performance of:
receiving, from a remote control device, navigational inputs corresponding to arrow buttons;
responsive to the navigational inputs, changing which particular phrase in the arrangement is in focus;
wherein the selection input selects the particular phrase that is in focus.

8. The one or more non-transitory computer-readable media of claim 6, wherein the instructions, when executed by the one or more computing devices, further cause performance of:
receiving, from a server system, at least a first phrase and an indication that the first phrase has been used in a first message sent by a first user within a certain period of time after a first media playback device associated with the first user played at least a first portion of the identified media content;
selecting the first phrase for inclusion in the arrangement because of the indication.

9. The one or more non-transitory computer-readable media of claim 6, wherein the instructions, when executed by the one or more computing devices, further cause performance of:
receiving, from a server system, popularity scores for at least a first set of phrases, relative to the identified media content;
generating the arrangement based at least on the popularity scores.

10. The one or more non-transitory computer-readable media of claim 6, wherein the instructions, when executed by the one or more computing devices, further cause performance of:
receiving, from a server system, data associating at least some of the phrases with the identified media content;
sending the message through the server system.

11. A method comprising:
identifying media content that has been at least partially played at a media playback device within a recent period of time;
presenting, within a message composition interface, an arrangement of phrases selected based on the identified media content;
receiving selection input that selects a particular phrase from the arrangement;
responsive to the selection input, inserting the particular phrase into a message being composed within the message composition interface;
receiving, from a server system, metadata describing the identified media content;
selecting at least one of the phrases for inclusion in the arrangement from the metadata, including at least one of: a title, actor or actress name, writer name, air date or time, channel, clip, or image.

12. The method of claim 11, further comprising:
receiving, from a remote control device, navigational inputs corresponding to arrow buttons;
responsive to the navigational inputs, changing which particular phrase in the arrangement is in focus;
wherein the selection input selects the particular phrase that is in focus.

13. The method of claim 11, further comprising:
receiving, from a server system, at least a first phrase and an indication that the first phrase has been used in a first message sent by a first user within a certain period of time after a first media playback device associated with the first user played at least a first portion of the identified media content;
selecting the first phrase for inclusion in the arrangement because of the indication.

14. The method of claim 11, further comprising:
receiving, from a server system, popularity scores for at least a first set of phrases, relative to the identified media content;
generating the arrangement based at least on the popularity scores.

15. The method of claim 11, further comprising:
receiving, from a server system, data associating at least some of the phrases with the identified media content;
sending the message through the server system.

16. The apparatus of claim 4, wherein the popularity scores indicate how frequently phrases within the first set of phrases appear in messages sent in association with the identified media content.

17. The one or more non-transitory computer-readable media of claim 9, wherein the popularity scores indicate how frequently phrases within the first set of phrases appear in messages sent in association with the identified media content.

18. The method of claim 14, wherein the popularity scores indicate how frequently phrases within the first set of phrases appear in messages sent in association with the identified media content.

19. The apparatus of claim 1, wherein the apparatus is separate from the media playback device.

20. The one or more non-transitory computer-readable media of claim 6, wherein the message composition interface is presented at a device that is separate from the media playback device.

21. The method of claim 11, wherein the message composition interface is presented at a device that is separate from the media playback device.

* * * * *